Aug. 26, 1952 G. B. TENER ET AL 2,608,138
WELD BEAD TRIMMER
Filed Jan. 13, 1948 4 Sheets-Sheet 2
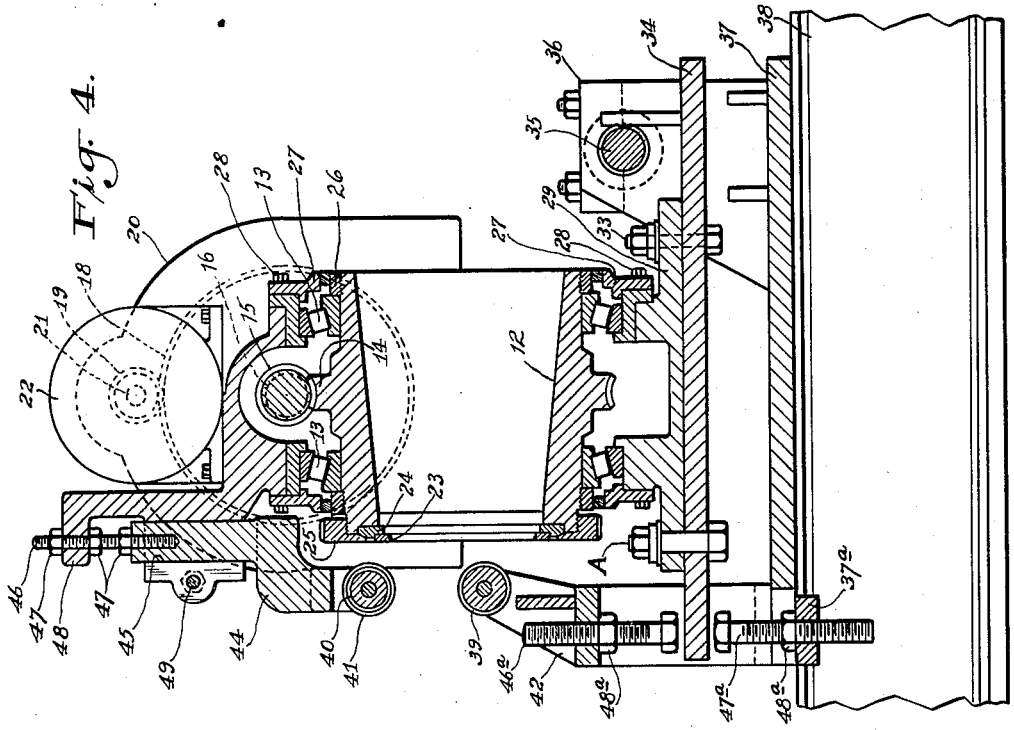
INVENTORS
GRAYDON B. TENER
BY and COMER D. HAZEN
J. E. Dickinson
Their Attorney INVENTORS
GRAYDON B. TENER
and COMER D. HAZEN
BY J.E. Dickinson
Their Attorney Aug. 26, 1952  G. B. TENER ET AL  2,608,138
WELD BEAD TRIMMER
Filed Jan. 13, 1948  4 Sheets-Sheet 4

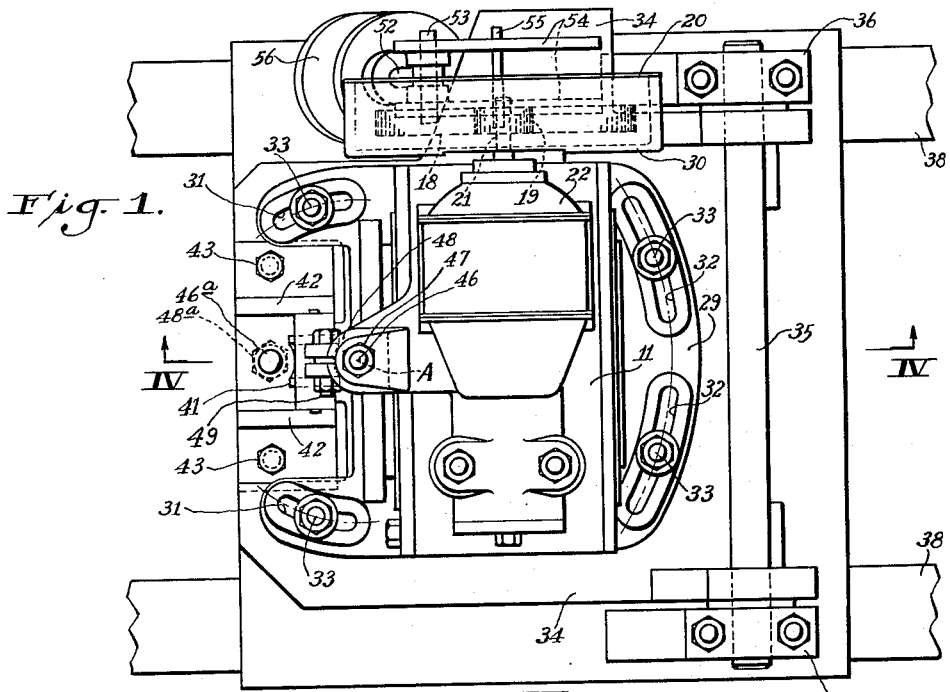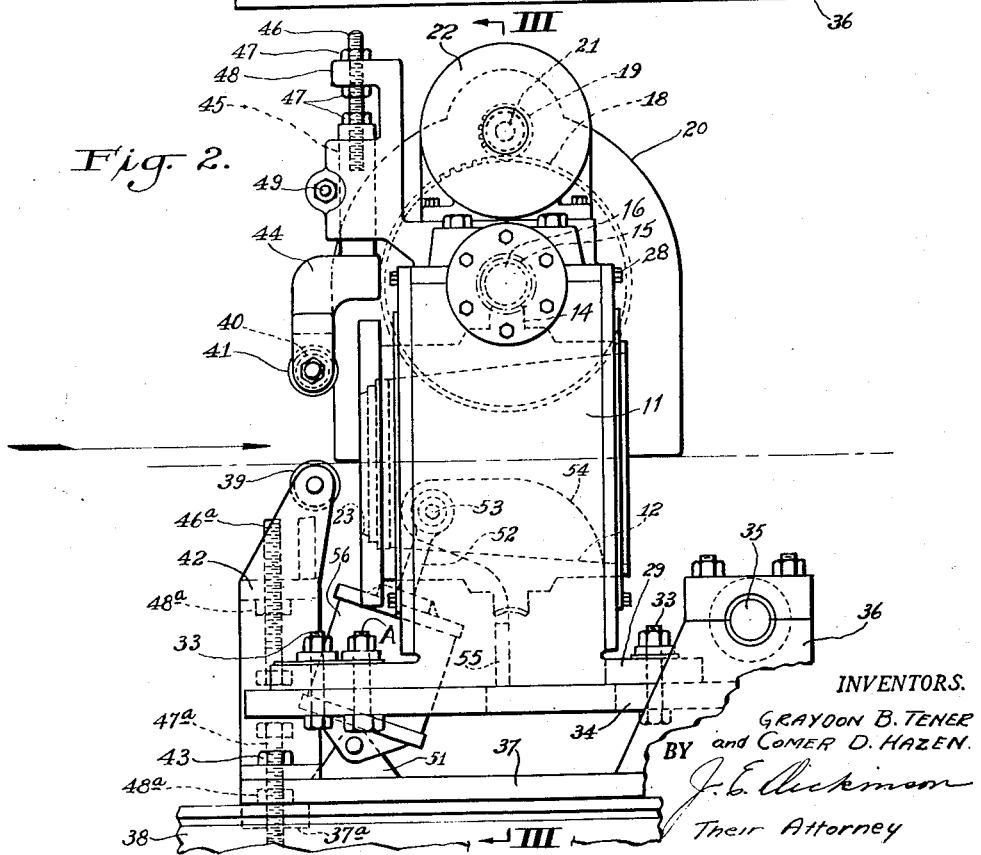

INVENTORS
GRAYDON B. TENER
and COMER D. HAZEN
BY J. E. Dickinson
Their Attorney

Patented Aug. 26, 1952

2,608,138

UNITED STATES PATENT OFFICE 2,608,138

WELD BEAD TRIMMER

Graydon B. Tener, Edgeworth, Pa., and Comer D. Hazen, Wheeling, W. Va., assignors to United Engineering & Foundry Company, Pittsburgh, Pa., a corporation of Pennsylvania Application January 13, 1948, Serial No. 2,083

8 Claims. (Cl. 90—24)

This invention relates to an improvement in apparatus for use in trimming the weld bead from seam welded tubing as it issues from a welding apparatus and, in particular, to trimming apparatus the driven cutting tool of which is so constructed and supported that the cutting surface thereof, making contact with the weld metal extending above the surface of and to be removed from the tubing, constantly changes.

Heretofore, many and varied types of trimming devices for weld flash removal have been proposed and employed in tube welding lines but, in the use thereof, it has been found that the tubes tend to become flattened somewhat along the seam by reason of the pressure exerted on the hot metal by hold down rollers or the like associated therewith, or through inadequate support, as well as lack of fineness of adjustment of the knife and knife holding members thereby causing considerable undercutting of the parent metal. Then, too, in those weld flash removers employing a trimming knife in which the cutting surface maintained in contact with the excess material being removed remains in a fixed position, rapid dulling of the knife takes place requiring frequent re-dressing or replacement thereof. With apparatus employing the features of the weld bead trimming device disclosed herein, flattening of the tube along the seam is avoided and the adequately supported annular cutting tool, due to the fact that a new cutting surface is constantly being brought into contact with the weld metal to be removed, is capable of giving satisfactory service over a long period of operating time before replacement or re-dressing thereof is required.

It is one object of this invention to provide apparatus for efficiently removing the weld bead from tubing, immediately following the welding thereof, thereby to present a smooth, clean surface at the welded joint.

Another object is to provide a weld bead removing device which is readily adjustable for accommodating various sizes of tubing issuing from adjacent welding apparatus with which it is associated.

Still another object is to provide a weld bead removal device in which the annular cutting tool encircling the welded tubing can be adjusted to modify the transverse angle between the tool and the tubing thereby varying the angle of rake of the tool with respect to the weld bead metal along the seam.

These objects, as well as the various other novel features and advantages of this invention, will become apparent from the following specification and accompanying drawings of which:

Fig. 1 is a plan view of weld bead trimming apparatus embodying features of the invention herein disclosed;

Fig. 2 is an end view of the apparatus illustrated in Fig. 1;

Fig. 3 is a sectional view taken at III—III of Fig. 2;

Fig. 4 is a sectional view taken at IV—IV of Fig. 1;

Figure 5:
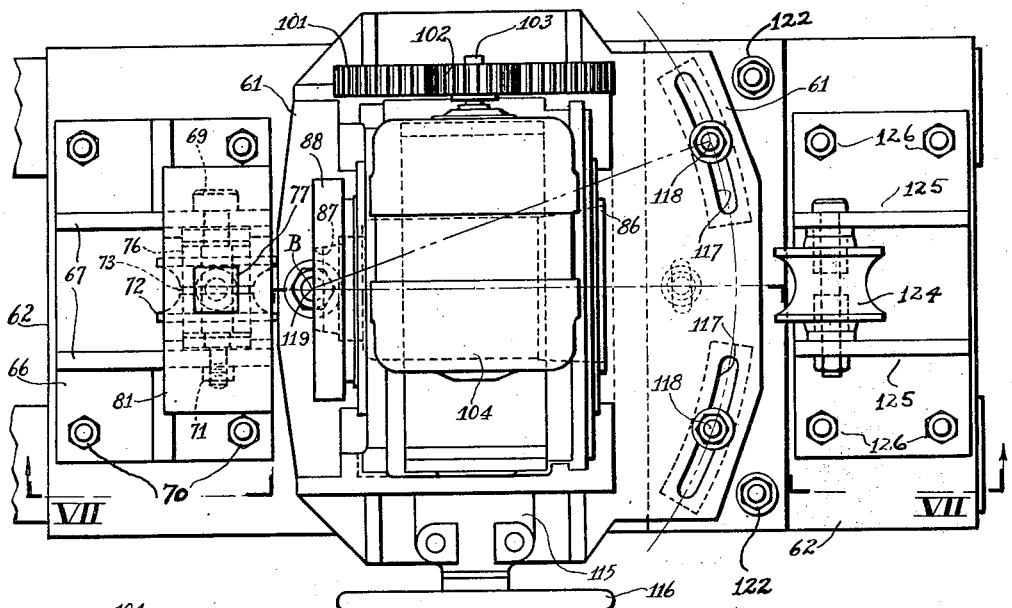
Fig. 5 is a plan view of a modified weld bead trimming apparatus.

With reference to the drawings, Figs. 1 through 4, the form of weld bead trimming device illustrated therein includes a frame 11 within which is rotatably mounted a tapering barrel 12, supported by bearings 13, provided with a worm gear 14 in mesh with a worm 15 mounted on a shaft 16 supported within suitable bearings 17 on the frame. To one end of shaft 16 is secured a gear 18 in mesh with pinion 19 keyed to the shaft 21 of an electrical driving motor 22 affixed to the frame. An annular cutting tool 23, brazed to a ring 24, is secured to the entry end of the barrel 12 by means of a retaining ring 25 engaging with the edges of the ring 24 and threadedly secured to the barrel 12. Bearings 13, held in position by retainer rings 26 threaded on the ends of the barrel 12, are provided with a pair of seals 27 secured to the frame by studs 28. As shown in Figure 3, the two gears 18 and 19 are enclosed by two guards 20 and 30 fastened by studs 50 to the upper portion of the frame 11.

In the base 29, of frame 11, as best shown in Figures 1, 2 and 4, there are provided two slotted openings 31 at the forward portion thereof and a pair of slotted openings 32 at the back portion, the slots being arcs of a circle described about point A, around which point the frame can be turned to a limited extent by loosening bolts 33 which pass through openings 31 and 32 for securing the base 29 to the base plate 34. A rock shaft 35, for permitting limited pivotal movement upward of frame 11, is attached to the base plate 34 and the ends thereof confined within pedestal bearings 36 mounted upon a platform comprising a plate 37 resting upon and secured to two I-beams 38 forming the foundation for the unit.

On the entry side of the trimming device is a pair of guide rollers 39 and 41, roller 39 being rotatably positioned between two supporting elements 42 fastened to the plate 37 by bolts 43, and roller 41 having a groove 40 passing around the periphery thereof, rotatably secured to member 44. Roller supporting member 44 is slidably retained within a guide 45 and adjustable vertically by means of an adjusting screw 46, having a plurality of locknuts 47 thereon, secured to a boss 48 projecting forward from the frame 11. For locking roller 41 in a vertically selected position, a bolt 49 is tightened to clamp the sides of the guide 45 against member 44 to prevent accidental displacement thereof. In order to restrict the amount of pivotal movement of the base plate 34, two vertically adjustable stops 46a and 47a are, respectively, threadedly secured to the supporting elements 42 and to the pad 37a welded to the under side of plate 37. Each of the two stops 46a and 47a may be re-located, for raising or lowering the outer end of base plate 34, simply by loosening the locking nuts 48a thereof, rotating the stops to cause them to be raised or lowered depending upon the diameter of tubing to be accommodated, and again tightening the locking nuts 48a. Though not shown, a sizing mill or the like usually follows closely adjacent to the bead trimmer and lends adequate support for the tubing as it issues from the trimming apparatus.

In accordance with Figure 3, a reversible fluid motor 56, connected to a source of power, not shown, is pivotally mounted at one end to a bracket 51 welded to plate 37, and the end of the piston rod 52 thereof pivotally secured, by means of a pin 53, between two arms 54, having a bracing plate 55 therebetween, welded to the base plate 34.

The construction of the device having been described in detail, operation thereof may be briefly summarized as follows:

Depending upon the diameter of the welded tubing from which the bead is to be removed, guide roller 41 is adjusted and locked in a preselected vertical position, and the adjustable stops 46a and 47a positioned to permit the desired tilting of the frame 11 and the elements carried thereby. As tubing issues from the particular tube welding apparatus associated with the weld bead trimming device, the seam thereof, being at the top, is bridged by the groove 40 of roller 41. Rotation of the tubing is prevented by the welding and forming rolls of the welder, in which the tubing is gripped firmly, so that the bead is maintained in the topmost position as the tubing is fed into the barrel 12 and in contact with the rotating annular cutting tool 23. In those cases in which tubing issuing from the welder is slightly bent at the leading end as a result of the heat of welding, it is possible that some difficulty may be experienced in directing the end of the tubing into the barrel 12. Such a condition is provided for by actuating the fluid motor 56, either by having the attendant open the valves therefor or by means of an electric eye control system, to tilt the frame 11 upward for permitting the tubing end to enter into the barrel, and immediately reversing the action of the fluid motor 56 to bring the rotating annular cutting tool downward and into contact with the moving tubing for effecting removal of the weld bead therefrom. The depth of cut is determined by the adjustable roller 41 contacting the pipe in advance of the annular cutting tool 23. Depending upon the amount of rake desired between the annular cutting tool and the tubing, the entire frame 11 and elements carried thereby can be shifted about the vertical axis passing through point A to any desired position. Should there be any irregularities of the outside diameter of the tubing, the roller 41 together with the cutting tool 23 supported by a frame on a common base plate 34, will adjust themselves vertically inasmuch as the fluid motor 56 will yield to the extent necessary to accommodate such irregularities, so that gouging of the tubing by the cutting tool is prevented.

Figure 6:
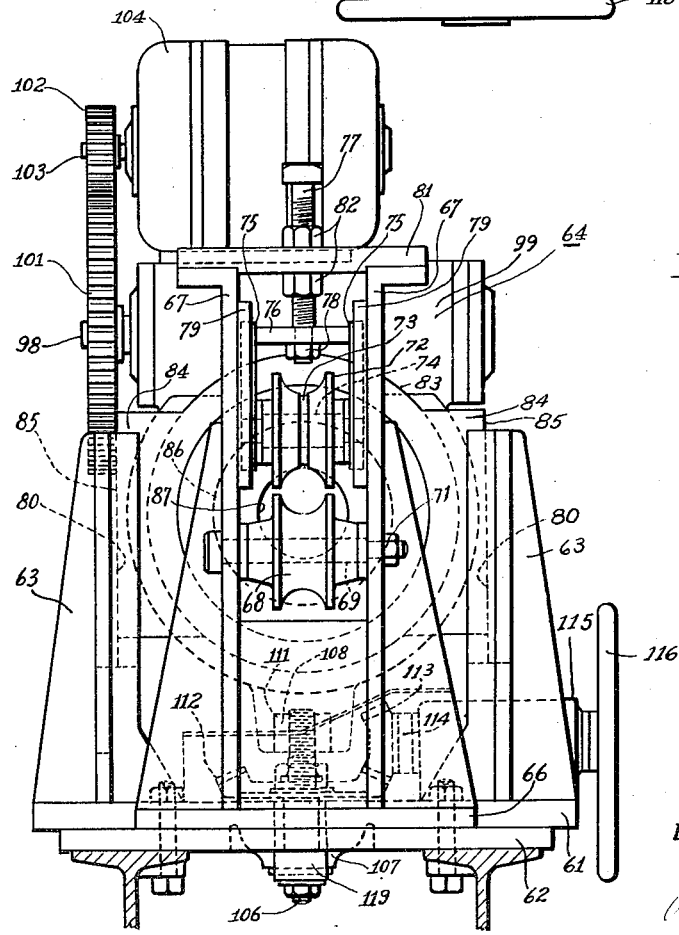
Fig. 6 is an end view of the apparatus shown in Fig. 5.
Figure 7:
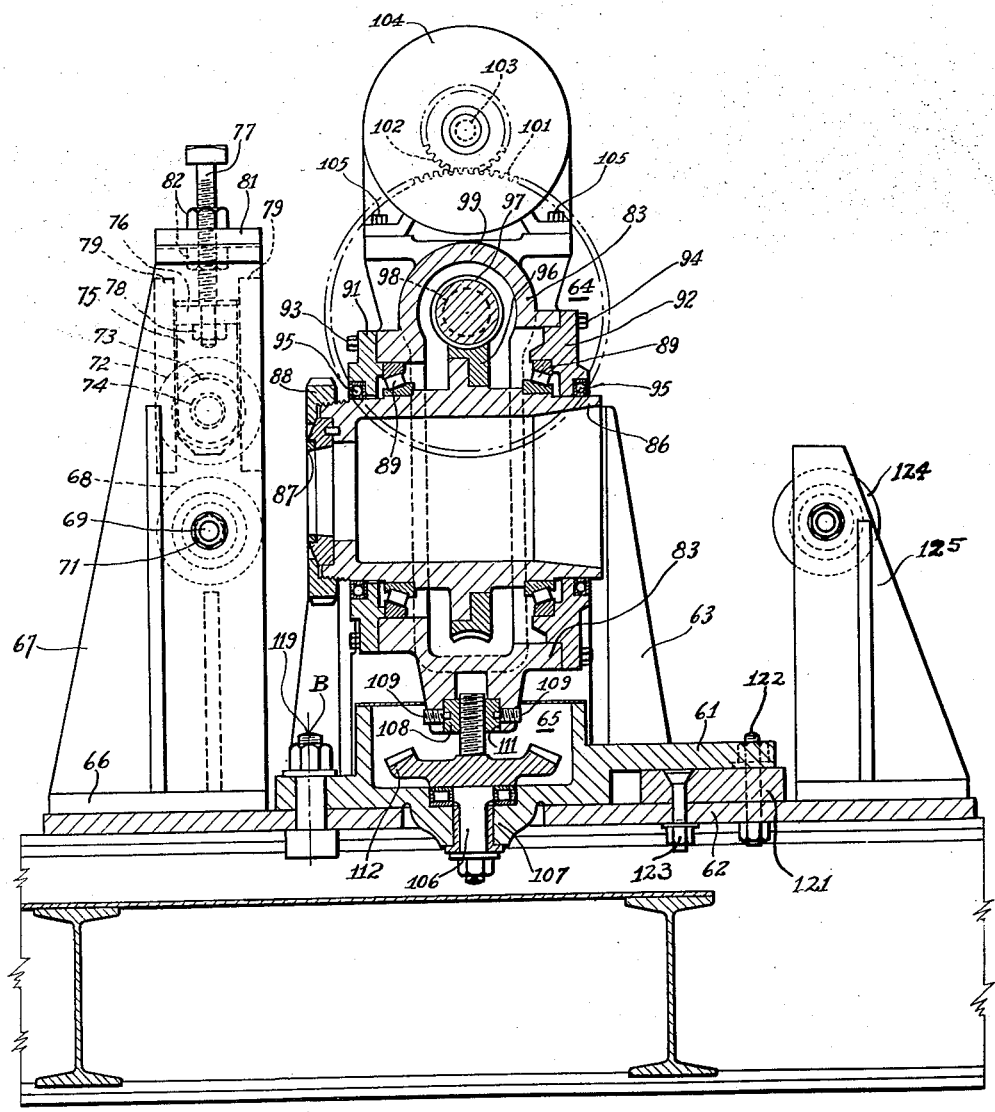
Fig. 7 is a partial sectional side elevation view taken at VII—VII of Fig. 5.

One of the modifications of our invention, as illustrated in the drawings Figs. 5 through 7, comprises a frame having a base 61, attached to a platform 62, upon which are secured two parallel vertical side guides 63 between which is slidably received an annular cutting tool carrying assembly 64 adapted to be positioned vertically by means of a manually operable bevel gear drive unit 65. For insuring proper entry of the tubing into the trimming device, an adjustable guide roll unit is placed adjacent thereto and consists of a base 66, secured to the platform 62 by a plurality of bolts 70, having two upwardly extending spaced apart side portions 67 between which a non-adjustable bottom roller 68 is journaled upon a shaft 69 threaded at one end for receiving a nut 71 for firmly affixing the shaft in place, and an upper vertically adjustable roller 72, having a groove 73 on the periphery thereof adapted to receive the bead extending above the welded seam of tubing passing between the rollers. The roller 72 is provided with a shaft 74 journaled at its ends in suitable bearings in two slidable end plates 75 having across the top thereof a bar 76 welded thereto and to which the lower necked-down end of an adjusting screw 77 is secured by a nut 78. Two pairs of bars 79 are welded to the inner surfaces of the side portions 67 to form channels within which the end plates 75 are received for guided movement vertically therein. A cap plate 81 is welded to the tops of the two upwardly extending side portions 67 through which passes the adjusting screw 77 adapted to be locked in place by the two locknuts 82.

As best shown in Figures 6 and 7, the cutting tool carrying assembly 64 includes a cage 83 having end plates 84 with the edges 85 thereof slidably received within the channels 80 of side guides 63 for vertical movement therein. A barrel 86, with an annular cutting tool 87 secured thereto at the entry end thereof by means of a retainer ring 88 threaded on the end of the barrel, is supported within the frame by roller bearings 89 held in position by retaining rings 91 and 92 respectively, secured to the frame by studs 93 and 94. An oil seal 95 is interposed between each of the retainer rings 91 and 92 and the barrel 86. Secured to the periphery of the barrel 86 is a worm gear 96 which meshes with a worm 97 mounted on a shaft 98 supported within suitable bearings in the housing 99 and having a gear 101 keyed to one end thereof meshing with a pinion 102 secured to the shaft 103 of an electrical driving motor 104 fastened to the top of the cage 83 by studs 105.

Manually operable bevel gear drive unit 65 comprises a vertical stub shaft 106, secured at the lower end within a bearing 107 provided in base 61, and threaded at the opposite end thereof for engagement with nut 108 secured by set screws 109 within a recess 111 at the bottom of cage 83. A bevel gear 112 is secured to the shaft 106 and meshes with a second bevel gear 113 keyed to one end of a shaft 114 supported in a suitable bearing 115 fastened to the base 61, and to which shaft a hand wheel 116 is affixed at the outward end thereof. The base 61 is provided with two arcuate slots 117 described about point B, around which point the assembly can be turned to a limited extent by loosening bolts 118 and pivot bolt 119 which pass through and secure base 61 to the platform 62. A spacing bar 121 upon which the overhanging portion of base 61 rests is attached to the platform 62 by bolts 122 and 123.

For assisting in the delivery of the processed tubing, issuing from the trimming apparatus, to a sizing mill or the like, a conveyor roller 124 is provided which is rotatably supported between two upright members 125 secured to the plate 62 by bolts 126.

In accordance with the provisions of the patent statutes, we have explained the principle and operation of our invention and have illustrated and described what we consider to represent the best embodiment thereof. However, we desire to have it understood that within the scope of the appended claims the invention may be practiced otherwise than as specifically illustrated and described.

We claim:

1. In apparatus for removing a weld bead from the seam of welded continuous tubing, a driven annular cutting means through which tubing is adapted to pass for removal therefrom of weld bead metal, means for supporting said cutting means, driving means for rotating said cutting means, and means for varying the angle of contact between said cutting means and said tubing.

2. In apparatus for removing a weld bead from the seam of welded continuous tubing, a driven annular cutting means through which tubing is adapted to pass for removal therefrom of weld bead metal, means for supporting said cutting means, driving means for rotating said cutting means, means for adjusting said cutting means vertically for accommodating tubing of different diameters, and guide means forward of said cutting means through which the weld bead of the tube passes for engagement thereby for assisting in the registration of said tubing with said cutting means for removal therefrom of said weld bead metal.

3. In apparatus for removing a weld bead from the seam of welded continuous tubing, a driven annular cutting means through which tubing is adapted to pass for removal therefrom of weld bead metal, means for supporting said cutting means, driving means for rotating said cutting means, means for varying the angle of contact between said cutting means and weld metal to be removed from said tubing, means for adjusting said cutting means vertically for accommodating tubing of different diameters, and guide means forward of said cutting means for bridging the weld bead of said tubing and assisting in the proper registration of said tubing with said cutting means for removal therefrom of said weld bead metal.

4. In apparatus for removing a weld bead from the seam of welded continuous tubing, a driven annular cutting means through which tubing is adapted to pass for removal therefrom of weld bead metal, means for supporting said cutting means, driving means for rotating said cutting means, means for adjusting said cutting means about a vertical axis for varying the angle of contact between said cutting means and said weld bead metal to be removed from said tubing, means for adjusting said cutting means vertically for accommodating tubing of different diameters, and guide means adjacent said cutting means for engaging said tubing and assisting in the proper registration thereof with said cutting means for removal therefrom of said weld bead metal.

5. In apparatus for removing a weld bead from the seam of welded tubing, a frame, an annular cutting tool rotatably supported therein through which tubing is adapted to pass for removal therefrom of weld bead metal, driving means mounted on said frame for rotating said cutting tool, locking means associated with said frame for permitting limited movement thereof about a vertical axis for varying the angle of contact between said cutting tool and weld bead metal to be removed from said tubing, means for adjusting said frame vertically for accommodating tubing of different diameters, a pair of rollers adjacent said frame at least one of which is grooved at the periphery thereof for bridging the weld bead of said tubing and assisting in the proper registration of said tubing with said cutting tool for removal therefrom of said weld bead metal.

6. In apparatus for removing weld bead metal from the seam of welded tubing, a frame, a barrel rotatably supported within said frame, an annular cutting tool affixed to said barrel through which tubing is adapted to pass for removal therefrom of weld bead metal, driving means mounted on said frame for rotating said barrel, locking means associated with said frame for permitting limited movement thereof about a vertical axis for varying the angle of contact between said cutting tool and weld bead metal to be removed from said tubing, means for adjusting said frame vertically for accommodating tubing of different diameters, a pair of vertically disposed rollers adjacent said frame at least one of which is grooved at the periphery thereof for bridging the weld bead of said tubing and assisting in the proper registration of said tubing with said cutting tool for removal therefrom of said weld bead metal.

7. In apparatus for removing weld bead metal from the seam of welded tubing, a frame, a barrel rotatably supported within said frame, an annular cutting tool affixed to said barrel, driving means mounted on said frame for rotating said barrel, locking means associated with said frame for permitting limited movement thereof about a vertical axis for varying the angle of contact between said cutting tool and weld bead metal to be removed from said tubing, means for adjusting said frame vertically for accommodating tubing of different diameters, a pair of vertically disposed rollers adjacent said frame at least one of which is grooved at the periphery thereof for bridging the weld bead of said tubing and assisting in the proper registration of said tubing with said cutting tool for removal therefrom of said weld bead metal.

8. In apparatus for removing weld bead metal from the seam of welded tubing, a base, guides secured to said base, a frame mounted between said guides and adjustable vertically therewith respect to said base, a barrel rotatably supported within said frame, an annular cutting tool affixed to said barrel, driving means mounted on said frame for rotating said barrel, locking means associated with said frame and base for permitting limited movement thereof about a vertical axis for varying the angle of contact between said cutting tool and weld bead metal to be removed from said tubing, means for adjusting said frame vertically for accommodating tubing of different diameters, a pair of vertically disposed rollers adjacent said frame at least one of which is grooved at the periphery thereof for bridging the weld bead of said tubing and assisting in the proper registration of said tubing with said cutting tool for removal therefrom of said weld bead metal.

GRAYDON B. TENER.
COMER D. HAZEN.

REFERENCES CITED

The following references are of record in the file of this patent:

UNITED STATES PATENTS

| Number | Name | Date |
|---|---|---|
| 323,006 | Whitney | July 28, 1885 |
| 2,033,967 | Yoder | Mar. 17, 1936 |
| 2,187,485 | Borgadt | Jan. 16, 1940 |
| 2,233,928 | Weaver | Mar. 4, 1941 |
| 2,390,627 | Truba et al. | Dec. 11, 1945 |
| 2,394,381 | Hoern | Feb. 5, 1946 |

FOREIGN PATENTS

| Number | Country | Date |
|---|---|---|
| 3,806 | Great Britain | Nov. 4, 1874 |
| 100,889 | Great Britain | July 10, 1917 |
| 240,071 | Great Britain | Sept. 24, 1925 |